(No Model.) 2 Sheets—Sheet 1.

C. D. McNEILL.
HAY PRESS.

No. 456,633. Patented July 28, 1891.

Witnesses
Ira R. Steward.
Alfred T. Gage.

Inventor
Charles DeWitt McNeill
by W. G. Johnson
his Attorney (No Model.) 2 Sheets—Sheet 2.
C. D. McNEILL.
HAY PRESS.
No. 456,633. Patented July 28, 1891.
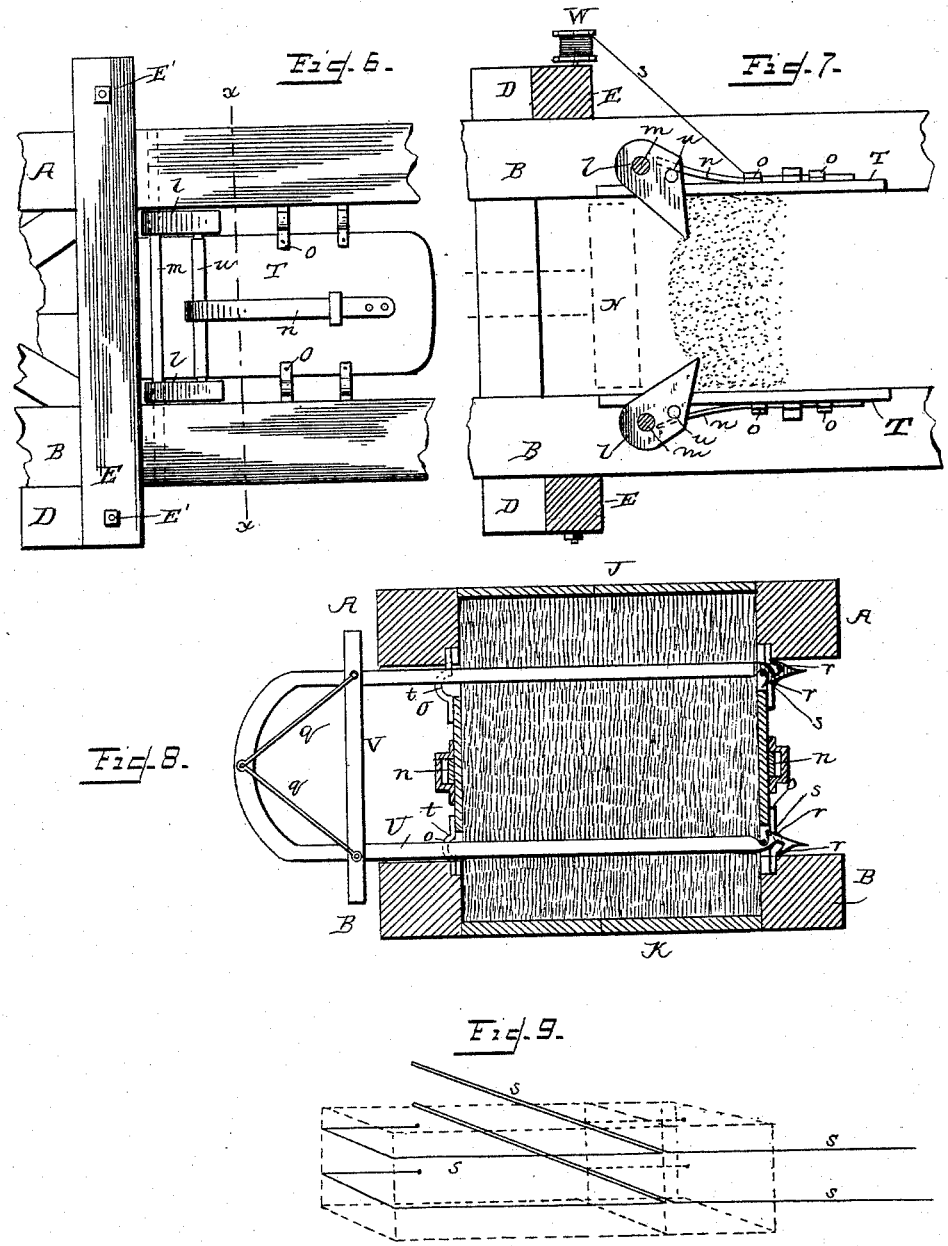

UNITED STATES PATENT OFFICE.

CHARLES DEWITT McNEILL, OF VICTORIA, TEXAS, ASSIGNOR OF ONE-HALF TO I. P. KIBBE.

HAY-PRESS.

SPECIFICATION forming part of Letters Patent No. 456,633, dated July 28, 1891.

Application filed January 23, 1890. Serial No. 337,800. (No model.)

*To all whom it may concern:*

Be it known that I, CHARLES DEWITT MC-NEILL, a citizen of the United States, residing at Victoria, in the county of Victoria and State of Texas, have invented certain new and useful Improvements in Hay-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to hay-presses, and has for its object to dispense with the necessity of using the ordinary division-blocks for separating one bale from another, to provide simpler, more expeditious, and efficient means for tying the bales, to simplify and increase the efficiency of the power head or stroke, and generally to cheapen the cost of production and ease of operation by simplifying the construction without detracting from the strength, durability, and life of the press, but, on the contrary, to increase its efficiency and render it capable of baling more hay in a given time than if otherwise constructed; and to the accomplishment of the foregoing and such other objects as may hereinafter appear, the invention consists in the construction and combination of parts hereinafter particularly described and claimed, reference being had to the accompanying drawings, forming part hereof.

Figure 1:
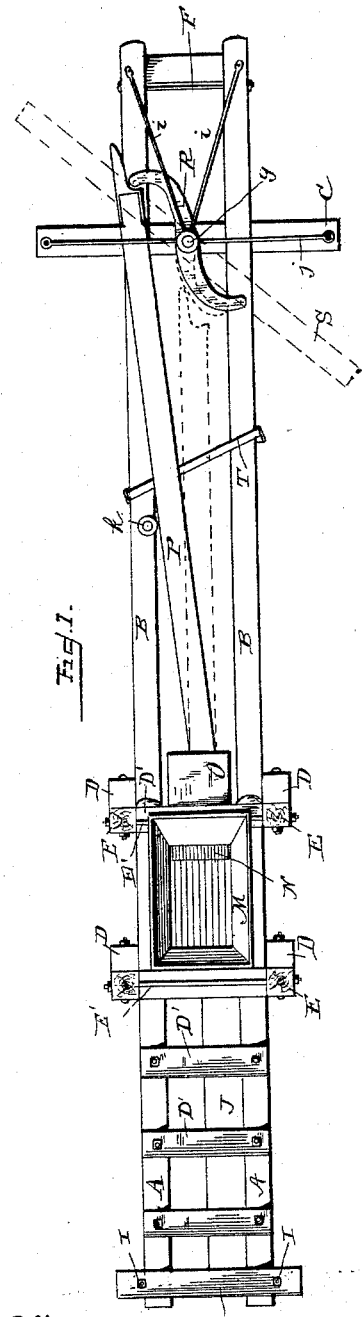
Figure 2:
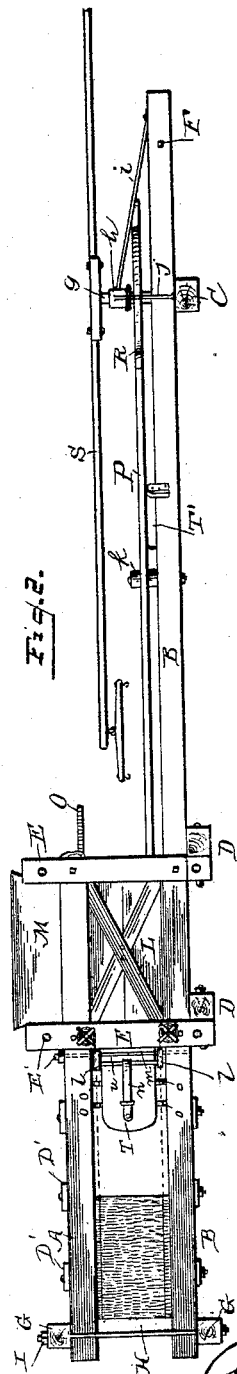
Figure 3:
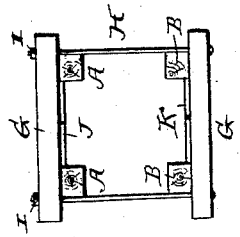
Figure 4:
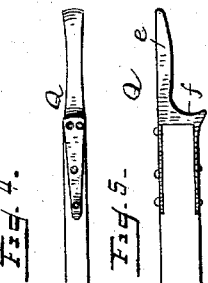
Figure 5:
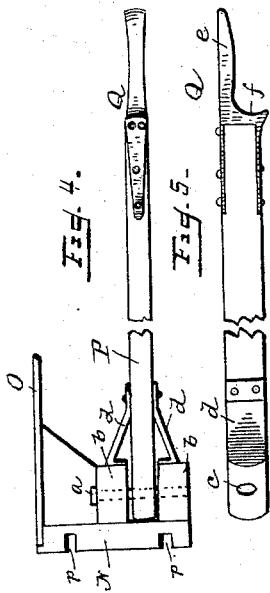

Figure 1 is a plan view of the press. Fig. 2 is a side elevation of the same. Fig. 3 is an end view of the tying-chamber. Fig. 4 is a side view of the plunger-head and pitman. Fig. 5 is a top view of the pitman. Fig. 6 is a side view of forward end of the tying-chamber, showing application of rebound-catches. Fig. 7 is a plan view of parts shown in Fig. 6 with the top sills removed. Fig. 8 is a vertical section on line $x$ $x$ of Fig. 6, showing needles applied. Fig. 9 is a perspective view showing bales in dotted lines and mode of applying wires in full lines.

In the drawings, the letter A designates the upper sills, and B the lower sills, the latter being connected together by the cross-timbers C, and the upper sills connected together by the cross-timbers D'. The upper and lower sills are connected together at the front and rear of the feed-box by upright timbers E, which are bolted to the upper and lower sills, and at their lower ends to two of the transverse timbers D, as illustrated in Figs. 1 and 2, while the two upright timbers themselves on one side of the box are connected to their corresponding timbers on the opposite side by bolts E, as illustrated. The parts are thus strongly braced and strengthened. The forward ends of the lower sills are connected together and braced by the transverse bolt F.

At the rear end of the press cross-timbers G lie across the top of the upper sills and across the bottom of the lower sills, and these upper timbers are connected to the lower timbers by bolts or rods H, which lie against the outside of the upper and lower sills, so as to brace them laterally, and at one end the bolts are provided with nuts I, so that by adjusting them the upper and lower timbers can be drawn together or allowed to separate, and in that way the diameter of the space or chamber between the sills can be varied and the size of the bale of hay controlled. The top of the baling-chamber is formed by the planks J, and the bottom by the planks K, fitted between the upper and the lower sills, respectively, while the sides of such chamber are open, all as shown. The sides of the feed-chamber may be entirely closed and provided with diagonally-extending braces L, while the top is provided with the feed-hopper M.

The plunger-head N is provided at its top with a rearwardly-extending apron O, which, as the plunger advances to compress the hay, closes the bottom of the feed-hopper to prevent hay falling down back of the plunger. This apron serves as a bottom to the hopper and supports the hay that may be fed into the hopper until the plunger-head is drawn back, and as the plunger is drawn back the hay passes from the apron down into the feed-chamber between the plunger and baling-chamber. The plunger is moved back and forth by means of the pitman P, which is pivoted to the plunger-head by a bolt $a$ passing through the blocks $b$, and a slot $c$ in the end of the pitman. This pitman is provided on its upper and lower faces with metal jaws $d$, which bear against the faces of the blocks $b$, so as to distribute the pressure, and at its forward end is provided with a metallic head Q, formed with an elongated lip or arm $e$, and a curved face $f$ at the base of the arm. This lip or arm forms an extended bearing-surface for the power-head, and the concave face receives the end of the power-head and prevents it from leaving the end of the pitman until the stroke of the power-head and of the plunger is completed, as illustrated by full and dotted lines in Fig. 1 of the drawings.

The power-head consists of an arm R, made in the form of a double reverse curve or elongated reversed-S shape, so that the hook ends of the arm will engage the metallic head on the end of the pitman. By making the power-head of the form shown there are two engagements of it with the end of the pitman in every revolution of the power-head, and with an eighteen-inch power-head of such form I can obtain a thirty-inch sweep of the pitman, which means a thirty-inch feed. The position of the pitman in full lines in Fig. 1 is supposed to represent its end fifteen inches from the center of the power-head, and its dotted-line position is supposed to represent it fifteen inches beyond the center of the head in the other direction, so that it will be apparent that in moving from one position to the other a distance of thirty inches is covered, and that represents a thirty-inch feed. The pitman, when the plunger-head is at the end of its forward stroke, will stand in a practically straight line with the length of the press, and naturally when the power-head leaves the end of the pitman the expansion of the hay will throw the pitman back in a straight line but by reason of the curve to the power-head the lever, when it strikes the curve of the head, will be deflected obliquely, and thus brought into the position illustrated in full lines in Fig. 1 in readiness to receive the stroke of the power-head.

The power-head is revolved by means of the power-lever S, secured to the top of the shaft $g$, which carries the arm R and is journaled in a suitable box on the base of the press-frame. The shaft $g$ passes through a sleeve $h$, from which rods $i$ extend diagonally to the two sills B, to which they are secured. These rods, together with the rods $j$, which extend laterally from the sleeve and are secured to the cross-timbers C, strongly brace the power-head, so that it is able to withstand all necessary strain. A roller T' extends obliquely between the two lower sills, and is journaled to the same at opposite ends, and serves as a rolling support for the pitman in its reciprocation, and by being placed obliquely it very materially reduces the friction in the oblique movement of the pitman before it assumes a parallel line with the side sills.

In order to guard against the possibility of the pitman being thrown or pushed too far to one side in its longitudinal movement while in an oblique position, I place a roller $k$ on one of the lower sills, as shown in Fig. 2, to serve as a guide for the lever.

The hay as it is pressed out of the feed-chamber and as the plunger is withdrawn from it is prevented from following the plunger back into the feed-chamber by means of catches $l$, one above the other, those on one side being connected together by an arm or rod $m$. They may also be connected together by a rod $u$, against which will bear one end of a spring-plate $n$, the other end of which is connected to a suitable support—say to a board or side piece T—suitably supported, say, by means of straps $o$, connecting the side piece (of which there may be one on each side of the press) to the upper and lower sills, there being left a space, as shown, at both the top and bottom of the side piece between it and the sills A and B. Through these open spaces the catches will project into the tying-chamber. The heads of the catches are beveled and allow the hay to pass them in one direction as it is pressed forward and prevent it from going backward with the plunger. The face of the plunger is formed with grooves $p$ for the catches to enter as the plunger is pressed forward, so that the plunger is free to be drawn back without interference from the catches.

From the construction described it will be seen that a single spring serves to press inward both catches and will yield to pressure in one direction to permit the hay to be pressed forward. By the rods $u$ bearing against the boards T the catches are prevented from passing too far into the chamber.

In tying the bales I dispense entirely with the usual follower or division blocks and employ instead a forked needle U, composed of two arms or fingers, connected together at one end, preferably by a neck formed integrally with the fingers, which fingers may be braced adjoining the neck by a transverse bar V, which may also serve as a stop to determine the distance that the needles shall pass the bale and indicate when the same is in position to be withdrawn with the binding or tying wire. This transverse bar may, if desired, be connected to the connecting-neck by the brace-wires $q$. The free ends of the fingers are formed with barbs or beards $r$, designed to hook the tying wire or cord and withdraw the same with the needle. It is preferred to form the barbs or beards on two sides of the fingers, so that they will catch or hook the tying cord or wire whether the fingers be over or under the wire. There are used in connection with this needle one or more reels, preferably two reels, of cord or wire, the same being located, preferably, so that one will be near the upper part of the bale and the other near the lower part. They are designated by the letter W, and are journaled so as turn on suitable bearings or axles secured to the side of one of the upright timbers of the press-frame, and, as illustrated, are located so that the wires or cords s delivered from the same are in line with the openings between the side pieces and the upper and lower sills, the wires passing between the hay and the straps o, which secure these side pieces to their places. To facilitate the passing of the wires, the straps are preferably formed with depressions t, in which the wires may lie, and which will serve as guides for the wires.

In operation the wires will be unwound from the reel sufficiently to pass them through the tying-chamber from the side where the reels are located to the other side and their free ends suitably secured or held so as not to slip back. Then as one charge of hay after another is fed from the feed-chamber the pressure of the same against the wire will unwind enough wire for the space occupied by the charge of hay. After enough hay has accumulated to form a bale the needle is passed through from the side opposite the reels and next to the inner end of the bale, so that the barbs or beards will catch or hook over the wires, the top finger hooking the upper wire and the bottom finger the lower wire. The needle is then drawn back and carries with it both the upper and the lower wires and, as is evident, loops or folds both wires in drawing them from one side to the other. After the wires are drawn far enough beyond the other side they are severed at the fold in each and one end of both wires tied to the other end that is around the completed bale, which securely ties that bale, while the other ends of the two wires are looped and suitably secured during the period of forming the next bale and in readiness for tying, as first described. This operation is repeated with each bale so long as the press is in use. It will thus be seen that the needle takes the place of the division-blocks and renders the tying of the bales easy and expeditious. It will also be observed that the feeding of the tying-wires is automatic, and that one man can perform the operation of tying, thus greatly expediting the operation and economizing time and labor. Whenever one reel of wire is exhausted, it can be quickly removed and a new bobbin of wire substituted. If desired, it can be arranged so that the needle in passing from one side to the other will pass through the grooves in the face of the plunger. In that event the plunger of course will pass the catches and be held by the pitman in place under pressure from the power-head until the bale is tied.

I have shown and with particularity described what I consider to be the best construction and operation of parts, but do not wish to be confined to such details, as variations may be made without departing from the spirit of my invention.

Having described my invention and set forth its merits, what I claim is—

1. In a hay-press, the combination, with the plunger, of the pitman for operating it, provided at its outer end with a metallic cap Q, formed with a concave face f, and an arm e, extended beyond said face in line with the length of the pitman, and a power-head composed of an arm R, curved from one extremity to the other to form on opposite sides a compound curve, as shown, the ends of said arms being adapted to engage the concave face of the cap to the pitman and the convex faces to bear against the extended arm of the cap and the power-lever, substantially as and for the purposes set forth.

2. In a hay-press, the combination, with the plunger and its pitman and means for actuating the same, of the roller T', extending obliquely across the press between the sills, with its end next the side where the power-head engages the pitman nearer the feed-box than its opposite end to both support the pitman and facilitate its oblique movement, and the revolving roller located to the side of the press toward which the pitman presses in its oblique movement and serving to hold said pitman to its place and prevent it from leaving said obliquely-arranged roller, substantially as and for the purposes set forth.

3. A needle for applying the binding wire or cord to a bale, comprising two arms connected together by a neck at one end and having a transverse bar V, connecting the two arms between their inner ends and said neck to brace them and extending beyond the opposite arms to form a stop, substantially as and for the purposes set forth.

4. A needle for applying the binding wire or cord to a bale, comprising two arms connected together at one end by a neck formed integrally therewith, and having catches or hooks r formed, as shown, on opposite sides of each arm to engage said wire, whether it lie above or below the arm, substantially as and for the purposes set forth.

5. In a hay-press, the combination, with the frame of the press, of side pieces T, straps o, connecting said pieces to the sills of the press, pivotal catches l, connected to the rods m and entering the baling-chamber, rods u, connecting the upper and lower catches together at a point in advance of the rods m and bearing against the side pieces T, and springs r, connected at one end to the side pieces and at the other bearing against said rods u, substantially as and for the purposes set forth.

In testimony whereof I affix my signature in presence of two witnesses.

CHARLES DEWITT McNEILL.

Witnesses:
 B. T. DAVIES,
 THOS. B. FOX.